United States Patent [19]

Ishibashi et al.

[11] Patent Number: 5,180,626
[45] Date of Patent: * Jan. 19, 1993

[54] OPAQUE AND PEARLESCENT, LAMINATED AND STRETCHED PRODUCTS, AND METHOD FOR MAKING THEM

[75] Inventors: Tadao Ishibashi; Kazuhiro Yamada, both of Ichihara, Japan

[73] Assignee: Chisso Corporation, Osaka, Japan

[*] Notice: The portion of the term of this patent subsequent to Nov. 26, 2008 has been disclaimed.

[21] Appl. No.: 582,100

[22] Filed: Sep. 14, 1990

[30] Foreign Application Priority Data

Sep. 25, 1989 [JP] Japan .................................. 1-246531

[51] Int. Cl.⁵ .............................................. B32B 7/02
[52] U.S. Cl. .................................... 428/213; 428/516; 428/910
[58] Field of Search ................ 428/220, 213, 516, 910

[56] References Cited

U.S. PATENT DOCUMENTS 4,293,608 10/1981 Isaka et al. ........................... 428/220
4,921,749 5/1990 Bossaert et al. ...................... 428/216

FOREIGN PATENT DOCUMENTS 1227039 10/1986 Japan.

OTHER PUBLICATIONS

Japanese Patent Publication No. 46(1971)-40794. Date of Publication: Dec. 2, Sho-46 (1971). Applicant: Mitsubishi Petrochemical Company, Ltd.
Japanese Patent Publication No. 63(1988)-24532. Date of Opening: Apr. 3, Sho-57 (1982) Applicant: Oji-Yuka Synthetic Paper Co., Ltd.

Primary Examiner—Edith Buffalow
Attorney, Agent, or Firm—Oblon, Spivak, McClelland, Maier & Neustadt

[57] ABSTRACT

An opaque and pearlescent, laminated and stretched product comprises a layer (A) and a layer (B) overlaid on and laminated by melt-adhesion to at least one side of the layer (A). The layer (A) forms a uniform layer comprising 97 to 70% by weight of a crystalline polypropylene and 3 to 30% by weight of a cyclopentadiene type petroleum resin having a softening point of 160° C. or higher and stretched in at least one direction. The layer (B) comprising a crystalline polypropylene whose crystalline melting point is higher or lower than that of the crystalline polypropylene forming the layer (A) by less than 10° C.

5 Claims, No Drawings

OPAQUE AND PEARLESCENT, LAMINATED AND STRETCHED PRODUCTS, AND METHOD FOR MAKING THEM

BACKGROUND OF THE INVENTION

1. Field of the Invention

The present invention relates to opaque and pearlescent, laminated and stretched products composed chiefly of a polypropylene. The present invention is concerned more specifically with opaque and pearlescent, laminated and stretched products obtained by laminating together a first layer opacified by adding a specific petroleum resin having a high softening point to a crystalline polypropylene and a second lustrous layer comprising a crystalline polypropylene, and a method for making them. In the present disclosure, the term "products" means sheet, film, yarn or filaments obtained by slitting such film as above, and molded products of sheet, film, etc.

2. Statement of the Prior Art

In general, pearlescent or opaque products having the form of uniaxially or biaxially stretched films are widely used as general-purpose packaging material, ornamental material, synthetic paper or transcription printing paper etc. or as packing material, weaving yarns, etc. in the form of tapes, ribbons or filaments, or even as hollow containers for various articles.

As heretofore known in the art, imparting pearlescence or opaqueness to products has generally been achieved by:

(1) adding to polypropylene lustering materials such as white pigments, extender pigments or pearl essence etc., (2) providing a large number of foams in products by adding foaming agents to polypropylene during molding, (3) adding inorganic fillers in a large amount to polypropylene and, then, stretching them to provide voids in them-see Japanese Patent Publication No. 63(1988)-24532 and Japanese Patent Laid-Open No. 63(1988)-117043-and (4) treating molded products with solvents or chemicals etc. to make them dull.

These techniques, however, have the following drawbacks. That is, problems with the first technique are that it is difficult to obtain pearlescence with white pigments and extender pigments, and pearl essence is very costly and moreover has to be added to polypropylene in a large quantity. With the second technique, it is difficult to provide uniform and fine foams in thin products such as films, because the foams have a tend to become large in size. A problem with the third technique is that, since the inorganic fillers are added to polypropylene in large quantities, there is a great deal of drop of fluidity during extrusion or occurrence of clogging of a screen pack. Another problem is that the inorganic fillers tend to absorb moisture, causing poor dispersion of the inorganic filler and generation of foams in the products, and the replacement of resins in the molding-machine takes much time. Yet another problem is that the product becomes ill-lustered and roughened on its surface. A problem with the fourth technique is that a treating step needs to be provided separately after a forming step and further needed are a step of removing the solvents and chemicals, suffering from a disadvantage in terms of the equipment and expense. Another problem is that the product thus produced has a dull touch and is ill-lustered.

An object of the present invention is to provide opaque and pearlescent, laminated and stretched products which are free from the above-mentioned defects of the prior art.

As a result of an extensive investigation, the inventors have already found that stretching under specific conditions of polypropylene to which a specific amount of a petroleum resin having a specific high-softening point is added can give light-weight stretched products of opaqueness and pearlescence, which are better in formability than conventional ones, and filed a patent application for them (Japanese Patent Application No. 1(1989)-74919). The products thus obtained by this method are better than conventional ones. However, their surface luster or pearlescence was still less than satisfactory for ornamental purposes. Further studies have now revealed that the above-mentioned object is achieved by the provision of products in which a layer of surface gloss, comprising a specific crystalline polypropylene, is laminated on an opaque layer comprising a crystalline polypropylene and a specific petroleum resin with a high softening point, thereby improving its surface gloss considerably.

SUMMARY OF THE INVENTION

According to one aspect of the present invention, there is provided an opaque and pearlescent, laminated and stretched products characterized by comprising a layer (A) and a layer (B) overlaid on and laminated by melt-adhesion to at least one side of said layer (A), said layer (A) forming a uniform layer comprising 97 to 70% by weight of a crystalline polypropylene and 3 to 30% by weight of a cyclopentadiene type petroleum resin having a softening point of 160° C. or higher and being stretched at least uniaxially, and said layer (B) comprising a crystalline polypropylene whose crystalline melting point is higher or lower than that of the crystalline polypropylene forming said layer (A) by less than 10° C.

According to another aspect of the present invention, there is provided a method for making the above-mentioned laminated and stretched products, characterized in that:

a composition comprising 97 to 70% by weight of a crystalline polypropylene and 3 to 30% by weight of a cyclopentadiene type petroleum resin having a softening point of 160° C. or higher is melt-extruded into a thin precursor layer for a layer (A), while a crystalline polypropylene whose crystalline melting point is higher or lower than that of said crystalline polypropylene for the precursor layer for said layer (A) by less than 10° C. is melt-extruded into a thin precursor layer for a layer (B);

said precursor layer for said layer (B) is overlaid and laminated on at least one side of said precursor layer for said layer (A) by melt-adhesion to obtain a laminated material; and said laminated material is finally stretched in at least one direction at a temperature lower than the crystalline melting point of the crystalline polypropylene forming the precursor layer for said layer (A) and at a stretching ratio of 2 or more.

According to yet another aspect of the present invention, there is provided a method for making the above-mentioned laminated and stretched products, characterized in that:

a composition comprising 97 to 70% by weight of a crystalline polypropylene and 3 to 30% by weight of a cyclopentadiene type petroleum resin having a softening point of 160° C. or higher is melt-extruded and then stretched uniaxially at a temperature lower than the crystalline melting point of said crystalline polypropylene and at a stretching ratio of 1.5 or more into a thin precursor layer for a layer (A), while a crystalline polypropylene whose crystalline melting point is higher or lower than that of said crystalline polypropylene for the precursor layer for said layer (A) by less than 10° C. is melt-extruded into a thin precursor layer for a layer (B);

said precursor layer for said layer (B) is overlaid and laminated on at least one side of said precursor layer for said layer (A) by melt-adhesion to obtain a laminated material; and said laminated material is finally stretched in at least one direction at a temperature lower than the crystalline melting point of said crystalline polypropylene forming the precursor layer for said layer (A) and at a stretching ratio of 2 or more.

DETAILED EXPLANATION OF THE INVENTION

The crystalline polypropylene for layer (A) used in the present invention is a homopolymer of propylene or a copolymer of binary or more containing at least 70% by weight of a propylene component with ethylene or an α-olefin having 4 carbon atoms or more. For instance, use may be made of crystalline polypropylene, a crystalline ethylene/propylene copolymer, a crystalline propylene/butene-1 copolymer, a crystalline ethylene/propylene/butene-1 terpolymer and a crystalline ethylene/propylene/hexene-1 terpolymer or their mixtures. These polymers may be obtained by the homo- or co-polymerization of monomers in conventional manners such as slurry, solution and vapor-phase polymerization techniques with known stereospecific catalysts such as Ziegler-Natta catalysts and their variations. These crystalline polypropylene are well-known in the art. In the present invention, however, preference is given to polymers containing 80-100% by weight of a propylene component and at least 80% by weight of residues upon extraction by boiling n-heptane.

Preferably, the crystalline polypropylene should have a melt flow rate (measured according to JIS K 7210, Test Condition 14, and refered to as MFR for short) ranging from 0.3 to 10.

The cyclopentadiene type petroleum resin (hereinafter often referred simply to as the petroleum resin) to be incorporated into the crystalline polypropylene to form layer (A) may be unhydrogenated petroleum resins, one of them being a homopolymer of a cyclopentadiene type component obtained from petroleum naphtha, and the other being a copolymer of 50% by weight or more of the cyclopentadiene type component with other fractions such as monovinyl aromatic hydrocarbons and indenes, or the hydrogenated petroleum resins obtained by hydrogenation of above-mentioned unhydrogenated petroleum resins, or their mixture. The cyclopentadiene type component is a fraction composed chiefly of cyclopentadiene and di-cyclopentadiene obtained from petroleum naphtha, their oligomer, their alkyl-substituted product or their mixture. The petroleum resin may be obtained by the thermal polymerization of the cyclopentadiene type component with or without other fractions for several hours in an atmosphere of an inert gas such as nitrogen gas etc. and in the presence or absence of a solvent. In order to obtain a resin having an increased softening point, this polymerization should effectively be carried out at two or more stages, rather than at a single stage. The hydrogenated petroleum resin may be obtained by hydrogenating such an unhydrogenated petroleum resin in conventional manners known in the art, for example, at a temperature of 150° to 300° C. and a hydrogen pressure of 10 to 150 kg/cm$^2$ in the presence of a solvent, using as a catalyst a metal such as palladium, nickel or cobalt or its oxide. These steps of polymerization and hydrogenation may be carried out either continuously or batchwise.

Of the cyclopentadiene type petroleum resins obtained in this way, those having a softening point (as determined by the ring-and-ball method to be described later) of 160° C. or higher should be used in the present invention. Products obtained from compositions containing petroleum resins having a softening point lower than 160° C. are so short of opaqueness and pearlescence that the object of the invention cannot be attained. Petroleum resins having a softening point lower than 160° C. make stretched products transparent, as is set forth in Japanese Patent Laid-Open No. 61(1986)-203140 and as is the case with conventional hydrogenated petroleum resins known in the art. This is in contrast to what is aimed in the present invention.

In the present invention, layer (A) forms a uniform layer in which 97-70% by weight of the crystalline polypropylene are melted and mixed with 3-30% by weight of the cyclopentadiene type petroleum resin and which has its molecular orientation resulting from stretching in at least one direction. If the amount of the petroleum resin to be blended is less than 3% by weight, then opacity would be so reduced that any pearlescence could not be obtained. At higher than 30% by weight, on the other hand, there would be surging in extrusion and breakdowns at the time of stretching, resulting in an excessive drop of productivity. Of the petroleum resins, preference is given to those having a softening point equal to or higher than the crystalline melting point of the polypropylene forming part of layer (A). Preferably, the petroleum resin is used in an amount of 5-25% by weight.

The crystalline polypropylene forming layer (B) may be a polymer or copolymer analogous to the crystalline polypropylene used for layer (A) or their mixture, and has a crystalline melting point higher or lower than that of the crystalline polypropylene used for layer (A) by less than 10° C. A difference of 10° C. or more between the both melting points tends to be less effective upon improving surface gloss.

It is noted that the term "crystalline melting point—hereinafter abbreviated to Tm"—refers to a peak temperature of an endothermic curve of about 10 mg of a sample occurring during the melting of its crystals. This peak temperature is obtained in the so-called second run of the process wherein, with a differential scanning calorimeter (DSC for short), the sample is melted by heating it up to 200° C. at a heating rate of 20° C./min and the melt is then cooled down to room temperature and re-heated. In some cases, a copolymer or a mixture of two or more polymers having different Tms shows two or more Tms. In this case, a temperature showing a maximum peak area is taken as the peak temperature.

The crystalline polypropylene and petroleum resin forming layer (A) and the crystalline polypropylene forming layer (B) may additionally be blended, as needs arise, with processing stabilizers, antioxidants, lubricants, slip additives, antistatics, inorganic fillers and small amounts of other polymers, which these substances are known to be ordinarily used with crystalline polypropylene, provided that the object of the invention is achievable.

In the laminated and stretched product according to the present invention, layer (A) is laminated on at least one side, i.e., one side or both sides with layer or layers (B) by melt-adhesion.

The overall thickness of the laminated and stretched products obtained according to the present invention are not critical, whereas the thickness ratio of layer (B) to layer (A) may preferably accounts for 0.6 or below, in particular 0.02 to 0.25. This is because as the thickness ratio of layer (B) to layer (A) in the products is higher than a certain value, both opaqueness and surface gloss tend to drop. It is also preferable that the total light transmittance of the product is 50% or lower and the gloss of layer (B) is 70% or more. A total light transmittance exceeding 50% gives rise to slight lack of opaqueness, and a gloss of layer (B) less than 70% results in a drop of the best pearlescence.

Reference will now be made to how to make the laminated and stretched products according to the present invention.

The composition for layer (A) comprising the crystalline polypropylene and the cyclopentadiene type petroleum resin is first prepared. This may easily be obtained by mixing the starting powdery or granular materials together at a given mixing ratio coming under the aforementioned range in an ordinary blender or mixer. Particular preference is given to pelletized compositions obtained by melt-mixing the raw materials together, using extruders, Banbury mixers, etc. In another preferable embodiment, a large amount of the cyclopentadiene type petroleum resin is added to the crystalline polypropylene or other polymers to prepare a master batch, which is in turn mixed with the crystalline polypropylene.

With the thus obtained composition for layer (A) and the crystalline polypropylene for layer (B), the laminated and stretched products may be obtained in such various manners as mentioned below.

(a) First, the composition for layer (A) is melt-extruded into a thin precursor layer for layer (A) on the one hand and the crystalline polypropylene for layer (B) is melt-extruded into a thin precursor layer for layer (B) on the other hand. Then, the precursor layer or layers for layer (B) is laminated on one or both sides of the precursor layer for layer (A) to prepare a laminated material. In this state, each layer of the laminated material is unstretched. Lamination may be carried out in various well-known manners. According to one particularly preferable embodiment, however, the composition for layer (A) and the crystalline polypropylene for layer (B) are each melt-extruded with two or more extruders. Then, layer (B) is laminated on at least one side of layer (A) of a base layer, both in a molten state, in known manners such as co-extrusion multi-layer die technique and feed block die technique. Finally, the thus obtained laminated material is uniaxially or biaxially stretched at a stretching ratio of at least 2 in one direction and at a temperature below the crystalline melting point of the crystalline polypropylene used for layer (A), thereby obtaining a laminated and stretched product having layers (A) and (B) stretched in the same direction.

(b) Alternatively, the unstretched precursor layer for layer (B) may be laminated on the precursor layer for layer (A) previously stretched in one direction. More illustratively, the composition for layer (A) is melt-extruded and uniaxially stretched at a stretching ratio of 1.5 or more and at a temperature below the crystalline melting point of the crystalline polypropylene contained in it to prepare the precursor layer for layer (A), while the crystalline polypropylene for layer (B) is melt-extruded into the precursor layer for layer (B). Then, the precursor layer for layer (B) is overlaid and laminated on at least one side of the precursor layer for layer (A) by melt-adhesion to prepare a laminated material. For instance, such a laminated material may easily be obtained in the shape of sheet, tube, pipe or others by melt-extruding the crystalline polypropylene for layer (B) on the thin precursor layer for layer (A) for lamination. Finally, the thus obtained laminated material is stretched at a stretching ratio of 2 or more in at least one direction. For instance, when stretching is carried out in the direction perpendicular to the initial uniaxial direction at a similar temperature as described in the procedure (a) and a stretching ratio of 2 or more, a laminated and stretched product is obtained, having layer (A) stretched biaxially and layer (B) stretched uniaxially. The laminated material may also be stretched biaxially.

When stretching the laminated material or forming the precursor layer for layer (A) according to the procedure (b), as mentioned above, the stretching temperature must be lower than the crystalline melting point of the crystalline polypropylene for layer (A). When the stretching temperature is equal to or higher than the crystalline melting point of the crystalline polypropylene for layer (A), the resulting product is ill-opacified and loses pearlescence. This is because crystalline of polypropylene in the stretched layer (A) is not oriented with the result that no desired fine voids occur in the laminated and stretched product. In order to increase opaqueness and pealescence, the stretching temperature should preferably be below both of the crystalline melting point of the crystalline polypropylene of layer (A) and the softening point of the cyclopentadiene type petroleum resin.

In order to ensure that such effects are further enhanced, the petroleum resins used should preferably be hydrogenated petroleum resins having a softening point of 165° C. or higher, which are used in a range of 5 to 30% by weight. Particular preference is given to those having a softening point of 170° to 200° C. and an iodine value of 20 or lower, which means that they are of a further increased degree of hydrogenation, since they are so excellent in their compatibility with the crystalline polypropylene that the composition comprising the highly hydrogenated petroleum resins in a range of 7 to 25% by weight and the crystalline polypropylene can be processed stably into layer (A), and give laminated and stretched products excelling in opaqueness and pearlescence.

The stretching ratio of the laminated material applied should preferably be 2 or more in at least one direction or, in terms of a ratio by area, should be 4 or more. Particular preference is given to simultaneous or successive biaxial stretching techniques carried out at a stretching ratio by area of about 10 to 60.

Particular preference is also given to biaxially stretched products obtained by performing simultaneous or successive biaxial stretching at a temperature lower than both of the crystalline melting point of the crystalline polypropylene used for layer (A) and the softening point of the cyclopentadiene type petroleum resin and at a stretching ratio by area of about 20 to 50.

The laminated and stretched products according to the present invention may otherwise be produced as follows.

(c) The thin precursors for layers (A) and (B), separately formed, overlaid on each other and then uniaxially or biaxially under the above-mentioned stretching conditions simultaneously adhering them into one piece by the heating for the stretching.

(d) The composition for layer (A) is melt-extruded and quenched to obtain a raw extrudate, which is then stretched uniaxially or biaxially under the above conditions to obtain a stretched product. Then, the crystalline polypropylene for layer (B) is extruded and laminated on that stretched product.

In any case, uniaxial or biaxial stretching may be achieved by either known uniaxial stretching techniques such as roll stretching, oven stretching or hot plate stretching or known simultaneous or successive biaxial stretching techniques such as tubular stretching, tentering and blow stretching.

After stretching, the stretched products may be heat-treated in known manners while they shrink several percents in the warp or weft direction. And they may be subjected on their surfaces to surface activation treatments such as corona discharge and plasma treatments in the air or in an inert gas atmosphere so as to improve their printability, adherence, etc.

The thus obtained laminated and stretching products are of a basic layer structure of (A)/(B) or (B)/(A)/(B). However, other layers may be sandwiched between layers (A) and (B). Printing, lamination, etc. may also be applied to the surfaces of the obtained laminated and stretched products.

EXAMPLES AND COMPARATIVE EXAMPLES

More illustratively, the present invention will now be explained specifically but not exclusively with reference to the following examples and comparative examples.

The characteristic values given throughout the present disclosure were estimated by the following methods.

(1) Softening Point (the ring-and-ball method)
JIS K 2207 (°C.).
(2) Iodine Value
JIS K 0070$_{-1966}$. This value refers to the number of grams of iodine absorbed in unsaturated components in 100 g of a sample.
(3) Total Light Transmittance
JIS K 6714 (%).
(4) Gloss
ASTM D 523 (measured at an angle of 20°; %).
(5) Melt Flow Rate (MFR)
JIS K 7210$_{-1976}$, Testing Condition 14 (at 230° C. and 2.16 kgf; g/10 mm).
(6) Density
Measured was the weight per 1 m$^2$ of a sample, which was turned into a weight per 1 cm$^2$ and divided by its thickness (cm) (g/cm$^3$).

COMPARATIVE EXAMPLE 1

In an extruder, 80% by weight of a crystalline polypropylene having an MFR of 2.5, a Tm of 162° C. and 95% by weight of matter insoluble in boiling n-heptane— (containing as antioxidants 0.2% by weight of BHT, 0.05% by weight of Irganox 1010 made by Chiba Geigy Co., Ltd. and 0.1% by weight of calcium stearate) was melt-kneaded with 20% by weight of a hydrogenated cyclopentadiene type petroleum resin having a softening point of 170° C. and an iodine value of 11 to obtain a pelletized composition. This composition had an MFR of 4.1. The composition was melt-extruded alone at 250° C. through an extruder having a bore of 40 mm and a T-die, and then quenched on a mirror-finished cooling roll of 30° C. to obtain an unstretched sheet-like raw material having a thickness of 1.0 mm. The sheet-like raw material was cut into a square piece, which was preheated at an oven temperature of 155° C. and thereafter stretched simultaneously in two directions at that temperature, each at a stretching ratio of 6.2, with a pantagraph type biaxial stretching machine. The stretched material is then heat-treated at that temperature for 10 seconds, while shrunk about 3%, thereby obtaining a biaxially stretched film having a thickness of 40 μm and a density of 0.61. This film was of sufficient opaqueness but lacking in pearlescence, as expressed in terms of a total light transmittance of 18% and a gloss of 51%.

EXAMPLE 1

The composition used for layer (A) was the pelletized composition used in Comparative Example 1 and the crystalline polypropylene used for layer (B) was a crystalline polypropylene (containing antioxidants and having an MFR of 2.7 and Tm of 162° C.) analogous to the crystalline polypropylene used for layer (A). With two extruders and an in-die lamination type two-feed-triple-layer die connected thereto, the composition for layer (A) was fed into one extruder having a bore diameter of 40 mm, while the crystalline polypropylene for layer (B) was fed into the other extruder having a bore diameter of 30 mm. Both compositions were extruded at 240° C. through the extruders, and then laminated together in the two-feed-triple-layer die into a three-layer structure in which the precursor layers for layer (B)—hereinafter often called (B')—were arranged on both sides of the precursor layer for layer (A)-(A')-, as shown as (B')/(A')/(B') while they were laminated in a molten state. The melt laminate was subsequently quenched on a mirror-finished cooling roll of 30° C. to obtain a laminated material having a total thickness of 1.2 mm comprising a core layer (A') having a thickness of 1.0 mm and surface layers (B') each having a thickness of 0.1 mm. This laminated material was cut into a square piece in a similar manner as described in Comparative Example 1. With a pantagraph type biaxial stretching equipment, the piece was pre-heated at an oven temperature of 155° C. and thereafter biaxially-stretched simultaneously in the weft and warp directions at that temperature, each at a stretching ratio of 6.2. The stretched product was heat-treated at the same temperature as above for 10 seconds, while it was shrunk about 3% to obtain a biaxially stretched film having a thickness of about 45 μm. This film was found to have a density of 0.65, a total light transmittance of 17%, a gloss of 105% and a (A) to (B) thickness ratio of 0.1 and was a beautiful, opaque film of unique pearlescence.

EXAMPLES 2~5 & COMPARATIVE EXAMPLES 2~3

As the composition for layer (A), use was made of various compositions comprising the same crystalline polypropylene as used in Example 1 and the hydrogenated cyclopentadiene type petroleum resins (hydrogenated products of a copolymer of 75% by weight of a cyclopentadiene fraction and 25% by weight of an aromatic hydrocarbon fraction) shown together with given amounts in Table 1. As the composition for layer (B), use was made of a crystalline polypropylene (containing antioxidants and having an MFR of 3.3 and a Tm of 162° C.) analogous to that used for layer (A). With the co-extruding equipment used in Example 1, comprising two extruders and a two-feed-triple-layer die, laminated materials of three layers (B')/(A')/(B'), each layer having the same thickness as in Example 1, were prepared in similar manners as mentioned in Example 1. Afterwards, biaxially stretched products of a three-layer structure were obtained by simultaneous biaxial stretching and heat treatment carried out with a pantagraph type biaxial stretching equipment under the same conditions as in Example 1. The characteristics of the obtained films are set out in Table 1.

TABLE 1

| | Hydrogenated Cyclopentadiene Type Petroleum Resin | | | Film Characteristics | | |
|---|---|---|---|---|---|---|
| | Softening Point (°C.) | Iodine Value | Amount (wt. %) | Density (g/cm³) | Total Light Transmittance (%) | Glossiness (%) |
| Comparative Example 2 | 150 | 11 | 20 | 0.92 | 95 | 135 |
| Example 2 | 165 | 16 | 20 | 0.77 | 32 | 115 |
| Example 3 | 173 | 10 | 20 | 0.66 | 19 | 112 |
| Example 4 | 175 | 11 | 10 | 0.74 | 25 | 116 |
| Example 5 | 188 | 15 | 5 | 0.83 | 46 | 124 |
| Comparative Example 3 | 188 | 15 | 1 | 0.90 | 86 | 130 |

The thickness of each of the obtained films was measured. As a result, it was found that even when the laminated materials have a same thickness before stretching, the thickness of the biaxially stretched films is inversely proportional to their density—the lower the density, the larger the thickness; for instance, the films of Comparative Example 2 and Example 3 are 33 μm and 45 μm in thickness respectively. In other words, the obtained films vary in thickness (apparent thickness) due to fine foams being produced therein by stretching.

As can be seen in Table 1, the films of Examples 2~5 are low in total light transmittance or opaque and are lustrous and pearlescent, whereas the films of Comparative Examples 2~3 are high in total light transmittance or transparent and are not pearlescent at all.

EXAMPLE 6

With an extruder, 85% by weight of a crystalline ethylene/propylene copolymer having an ethylene content of 0.5% by weight, an MFR of 3.0, a Tm of 158° C. and an insoluble matter of 92% by weight in boiling n-heptane (containing 0.2% by weight of BHT and 0.1% by weight of Irganox 1010 as antioxidants, 0.1% by weight of calcium stearate as a neutralizer and 0.2% by weight of glycerin monostearate as a dispersant) was melt-kneaded with 15% by weight of a hydrogenated cyclopentadiene type petroleum resin having a softening point of 173° C. and an iodine value of 9 to obtain a pelletized composition for layer (A). The crystalline polypropylene used for layer (B) was a crystalline ethylene/propylene copolymer having an ethylene content of 0.2% by weight, an MFR of 12.0, a Tm of 161° C. and 94% by weight of insoluble matter in boiling n-heptane (containing 0.1% by weight of BHT as an antioxidant and 0.1% by weight of calcium stearate as a neutralizer). With a tenter type equipment for making successively biaxially stretched films, combined to an extruder and a T-die, the composition for layer (A) was melt-extruded at 240° C., and was then quenched on a mirror-finished cooling roll of 40° C. into a sheet-like raw material of 1.2 mm in thickness, followed by stretching at a stretching ratio of 5.0 in the warp direction. With another extruder and T-die, the crystalline polypropylene for layer (B) was melt-extruded on the thus obtained uniaxially stretched sheet, immediately followed by quenching on a cooling roll of 30° C., thereby obtaining a two-layer laminated material in which an unstretched film or precursor layer (B') of 20 μm in thickness was overlaid on one side of the precursor layer (A'). Subsequently, the laminated material was guided into a tenter in which it was stretched at a stretching ratio of 8.0 in the weft direction in an atmosphere of 160° C. The stretched product was in turn heat-treated at the same temperature as above, and then it was shrunk about 4% in each of the weft and warp directions and cooled with cold air to obtain a two-layer stretched film having a total thickness of 45 μm in which a surface layer, uniaxially stretched film of about 3 μm in thickness was laminated on a bass layer, biaxially stretched film. This film had a density of 0.70, a total light transmittance of 27%, a surface gloss of 105% and a core gloss of 62%. A bag with the surface layer outside obtained from this film by bagmaking was pearlescent and suitable for ornamental purposes.

Comprising an opaque layer composed of a crystalline polypropylene and a specific petroleum resin having a high softeing point and a lyer composed of a specific crystalline polypropylene and having surface gloss, which is laminated on the opaque layer, the laminated and stretched products according to the present invention is not only of excellent pearlescence but also includes uniform and fine voids therein so that they are light in weight and have cushioning properties and are opaque and have light shielding properties. Thus, they can be used as films, yarns or filaments obtained by slitting such films for synthetic papers, general-purpose packaging material, ornamental material, packing materials, weaving yarn and so on. Hollow containers obtained from the present products by stretching blow techniques or other articles may also be used in various fields, while taking such various advantages as mentioned above.

We claim:

1. An opaque and pearlescent, laminated and stretched product comprising a layer (A) and a layer (B) overlaid on and laminated by melt-adhesion to at least one side of said layer (A), said layer (A) forming a uniform layer comprising 97 to 70% by weight of a crystalline polypropylene and 3 to 30% by weight of a cyclopentadiene derived petroleum resin having a softening point of 160° C. or higher and stretched in at least one direction, and said layer (B) comprising a crystalline polypropylene whose crystalline melting point is higher or lower than that of the crystalline polypropylene used for said layer (A) by less than 10° C.

2. A laminated and stretched product as claimed in claim 1, wherein said layer (B) is stretched in at least one direction.

3. A laminated and stretched product as claimed in claim 1 or 2, wherein said layer (A) comprises 95 to 75% by weight of a crystalline polypropylene and 5 to 25% by weight of a cyclopentadiene derived petroleum resin, said cyclopentadiene derived petroleum resin having a softening point equal to or higher than the crystalline melting point of the crystalline polypropylene used for said layer (A).

4. A laminated and stretched product as claimed in claim 1 or 2, wherein the thickness ratio of said layer (B) to (A) is 0.6 or below.

5. A laminated ans stretched product as claimed in claim 1 or 2, which has a total light transmittance of 50% or below and in which said layer (B) has a gloss of 70% or above.

* * * * *